(12) United States Patent
Rollet (10) Patent No.: US 12,289,254 B2
(45) Date of Patent: Apr. 29, 2025

(54) METHOD FOR PERFORMING SWITCHING FUNCTION AND SWITCHING DEVICE

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/277,316

(22) PCT Filed: Oct. 1, 2021

(86) PCT No.: PCT/JP2021/037259
§ 371 (c)(1),
(2) Date: Aug. 15, 2023

(87) PCT Pub. No.: WO2022/208950
PCT Pub. Date: Oct. 6, 2022

(65) Prior Publication Data

US 2024/0137333 A1   Apr. 25, 2024
US 2024/0236019 A9   Jul. 11, 2024

(30) Foreign Application Priority Data

Mar. 31, 2021   (EP) ..................... 21305410

(51) Int. Cl.
*G06F 15/16* (2006.01)
*H04L 45/00* (2022.01)
(Continued)

(52) U.S. Cl.
CPC ............ *H04L 49/254* (2013.01); *H04L 45/66* (2013.01); *H04L 47/6275* (2013.01); *H04L 49/252* (2013.01)

(58) Field of Classification Search
CPC .................................................. H04L 47/6275
See application file for complete search history.

(56) References Cited

U.S. PATENT DOCUMENTS 5,687,316 A  * 11/1997 Graziano .................. H04L 9/40
                                                            709/212
6,424,658 B1    7/2002 Mathur
(Continued)

OTHER PUBLICATIONS

International Search Report (PCT/ISA/210) issued in PCT/JP2021/037259, dated Dec. 1, 2021.
(Continued)

*Primary Examiner* — Padma Mundur
(74) *Attorney, Agent, or Firm* — Birch, Stewart, Kolasch & Birch, LLP (57) ABSTRACT

The present disclosure relates to a method for performing switching functions by a processing circuit of a switching device, the communication over the communication channel being organized according to successive first time slices and a second time slices, the processing circuit implementing a RTOS which in normal operation comprises a RTOS scheduler for scheduling a plurality of tasks having different priorities, said method comprising:
  applying, by the processing circuit, a first operating mode during each first time slice, in which normal operation of the RTOS is suspended and the processing circuit executes a single task which performs the switching functions;
  applying, by the processing circuit, a second operating mode in each second time slice, in which normal operation of the RTOS is resumed and switching functions are performed by a task which has not the highest priority of RTOS scheduler.

14 Claims, 4 Drawing Sheets

(51) Int. Cl.
*H04L 47/6275* (2022.01)
*H04L 49/25* (2022.01)
*H04L 49/253* (2022.01)

(56) References Cited

U.S. PATENT DOCUMENTS

| | | | |
|---|---|---|---|
| 6,760,328 B1 * | 7/2004 | Ofek | H04L 49/254 |
| | | | 370/503 |
| 2007/0033260 A1 | 2/2007 | Grouzdev et al. | |
| 2008/0155073 A1 * | 6/2008 | Swain | H04L 12/403 |
| | | | 709/251 |
| 2009/0192639 A1 | 7/2009 | Cellier et al. | |
| 2019/0044894 A1 | 2/2019 | Bonomi et al. | |
| 2019/0372913 A1 * | 12/2019 | Leyrer | G05B 19/4155 |
| 2020/0125405 A1 * | 4/2020 | Kaveri | G06F 11/3017 |
| 2020/0280457 A1 * | 9/2020 | Inoue | H04L 49/206 |
| 2020/0314030 A1 * | 10/2020 | Goel | H04L 45/74 |

OTHER PUBLICATIONS

Written Opinion of the International Searching Authority (PCT/ISA/237) issued in PCT/JP2021/037259, dated Dec. 1, 2021.

* cited by examiner

METHOD FOR PERFORMING SWITCHING FUNCTION AND SWITCHING DEVICE

TECHNICAL FIELD

The present disclosure relates to communication systems and relates more specifically to a method and device for performing switching functions.

BACKGROUND ART

In a typical industrial network, communicating devices are usually connected by a bus using a daisy chain topology. Typically, a master device (usually a programmable logic controller, PLC), sends data frames to other devices and each device that receives a data frame forwards it to adjacent devices if it is not the recipient of the received data frame. In the reverse direction, each device may also send data frames to the master device. Data frames generated by the device located at the other end of the daisy chain topology with respect to the master device of the daisy chain topology are forwarded by every intermediate device up to the master device.

To support this daisy chain topology, each device includes at least three-ports with two physical ports and one internal port. The physical ports of a given device are connected to e.g. respective medium access controllers, MAC, units, for communicating with the upstream and downstream devices in the daisy chain topology (assuming that the master device is the source). The internal port is an interface with a host stack of the device for handling data frames addressed to said device and to allow said device to transmit its own generated data frames to other devices. Each device performs switching functions enabling to forward a data frame received on any physical port towards another physical port (if said device is not the recipient of said data frame) or towards the internal port (if said device is the recipient of said data frame), and also to forward a data frame received on the internal port from the host stack towards one or more of the physical ports.

For instance, the data frames exchanged between the devices may be Ethernet data frames. In industrial networks, data frames may need to be exchanged with stringent time latency requirements. Time sensitive network, TSN, is the set of IEEE802.1 defined standard technologies to provide deterministic messaging on standard Ethernet protocols. The key to providing on-time delivery of time sensitive data frames is the IEEE802.1Qbv standard. More specifically, the IEEE802.1Qbv standard defines a time-aware scheduler designed to separate the communication on the Ethernet communication channel into repeated temporal cycles of fixed duration. Within these temporal cycles, different time slices can be configured that can be assigned to traffic classes having different priorities. Such time slices can be considered as virtual communication channels and enable the separation of time-critical traffic from non-critical background traffic.

Figure 1:
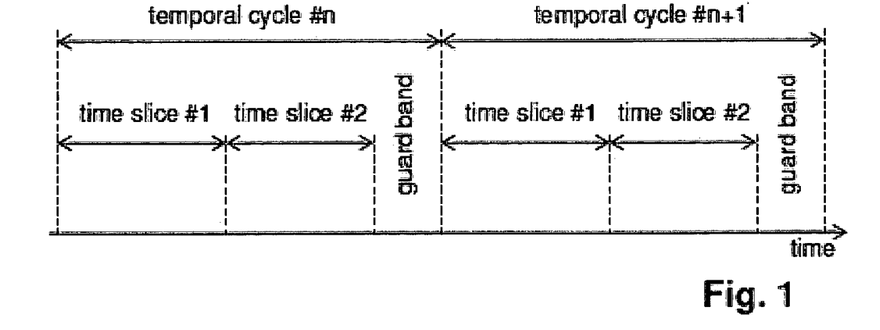
FIG. 1: already described, a diagram representing an example of temporal cycles and time slices as per the IEEE802.1Qbv standard.

FIG. 1 represents schematically a temporal diagram illustrating such temporal cycles and time slices as relied upon by the IEEE802.1Qbv standard. In the example illustrated by FIG. 1, two temporal cycles are represented denoted by respectively "temporal cycle #n" and "temporal cycle #n+1". Each temporal cycle comprises two time slices denoted by respectively "time slice #1" and "time slice #2". Also, a guard band is provided after the time slice #2 of each temporal cycle and before the beginning of the time slice #1 of the next temporal cycle. For instance, the time slices #1 may be reserved for data frames tagged with a virtual local area network, VLAN, priority 7 (as defined by the IEEE802.1Q standard), while the time slices #2 may be used for data frames tagged with VLAN priorities 0 to 6.

Hence, the standard IEEE802.1Qbv provides time slices on the communication channel (i.e. the set of buses between pairs of devices in the daisy chain topology) that are reserved for delivering critical data frames.

However, in order to ensure that critical data frames are delivered very quickly from one end to the other of a network having a daisy chain topology, each device needs to perform the TSN switching functions very quickly. In networks having very low latency requirements, the TSN switching functions are performed by a hardware component, typically an application specific integrated circuit (ASIC) or a field-programmable gate array (FPGA).

Although efficient, such a hardware-accelerated switching solution is costly and cannot be used for any type of industrial network device. Indeed, in many industrial networks, the devices are implemented over a micro-controller unit (MCU) connected to or integrating Ethernet MAC units, in which the switching functions cannot use hardware-accelerated switching solutions and need to be implemented by software. Although the use of a real-time operating system, RTOS, on the MCU enables to reduce to some extent the latency for tasks having high priority, it is not sufficient to achieve very low latency.

SUMMARY OF INVENTION

The present disclosure aims at improving the situation. In particular, the present disclosure aims at overcoming at least some of the limitations of the prior art discussed above, by proposing a solution for reducing the latency when performing software-based switching functions. In particular, the present disclosure aims at proposing a solution that may be implemented by an MCU connected to or preferably integrating e.g. Ethernet MAC units.

For this purpose, and according to a first aspect, the present disclosure relates to a method for performing switching functions by a processing circuit of a switching device, said switching device further comprising a host stack and at least two medium access controller, MAC, units for communicating data frames on a communication channel, said at least two MAC units being connected to the processing circuit, said switching functions comprising forwarding data frames received by one of the MAC units towards another one of the MAC units and/or towards the host stack and, optionally, forwarding data frames received from the host stack towards one of the MAC units, the communication over the communication channel being organized according to successive temporal cycles, each temporal cycle comprising at least a first time slice and a second time slice, said first time slices for communicating data frames having higher timing constraints than data frames communicated during said second time slices, the processing circuit implementing a real-time operating system, RTOS, which in normal operation comprises a RTOS scheduler for scheduling a plurality of tasks having different priorities, said method comprising:
  applying, by the processing circuit, a first operating mode during each first time slice, in which normal operation of the RTOS is suspended and the processing circuit executes a single task which performs the switching functions;
  applying, by the processing circuit, a second operating mode in each second time slice, in which normal operation of the RTOS is resumed and switching functions are performed by a task which has not the highest priority of RTOS scheduler.

Hence, the switching method relies on a fact that the communication over the communication channel is organized according to successive temporal cycles, each temporal cycle comprising at least a first time slice and a second time slice, said first time slices for communicating data frames having higher timing constraints than data frames communicated during said second time slices. This is typically the case, for instance, when using the IEEE802.1Qbv standard discussed above. In the sequel, the data frames communicated during first time slices are referred to as time-sensitive, TS, data frames, while data frames communicated during second time slices are referred to as non-TS, NTS, data frames.

The processing circuit implements a RTOS having in conventional manner a RTOS scheduler for scheduling a plurality of tasks according to their respective different priorities. Some of the tasks may relate to the switching functions, while some other tasks may relate to e.g. functions of the host stack. Second time slices are used for communicating NTS data frames, such that normal operation of the RTOS, and more specifically of its RTOS scheduler is sufficient for the timing constraints of the NTS data frames.

However, during first time slices, used for communicating TS data frames, normal operation is suspended to execute a single task performing the switching functions, in order to prevent the switching functions from being interrupted by other tasks. In particular, interrupts may be disabled, and the interrupt service routine, ISR, is not executed in the first operating mode, during the first time slices.

Thanks to the organization of the communication on the communication channel, the processing circuit of the switching device knows when first time slices and second time slices are scheduled and can therefore transition from applying the first operating mode to applying the second operating mode, and vice versa, based on the start and end times of the first and second time slices.

Hence, the latency of the switching functions is reduced for TS data frames by ensuring that they are performed by a single task that cannot be interrupted by other tasks, since it is the only task running during the first time slices used for TS data frames.

In the second operating mode, during the second time slices, the task performing the switching functions has not the highest priority, to allow the high priority tasks, that were prevented from running during the first time slices, to be prioritized over the task performing the switching functions.

In specific embodiments, the method can further comprise one or more of the following features, considered either alone or in any technically possible combination.

In specific embodiments, the processing circuit is configured to detect the reception of a data frame to be forwarded by recurrently polling status registers associated to buffers used to store data frames received from MAC units or from the host stack.

As discussed above, interrupts are typically disabled in the first operating mode, during the first time slices. Hence, to ensure that the reception of data frames to be forwarded is detected quickly and the associated processing code is executed quickly, the status registers of the buffers in which such data frames are stored when received is polled recurrently, for instance periodically. The latency for detecting data frames to be forwarded may be reduced by reducing the polling period.

In specific embodiments:
in the first operating mode, the processing circuit applies a cut-through scheme in which forwarding of a data frame by the switching functions starts before the whole data frame is received;
in the second operating mode, the processing circuit applies a cut-through scheme or a store and forward scheme in which forwarding of a data frame by the switching functions starts only after the whole data frame is received.

Using a cut-through scheme at least during the first operation mode, i.e. during the first time cycle when TS data frames are to be forwarded, enables to further reduce the latency of the switching functions.

In specific embodiments, in the cut-through scheme, each data frame received by a MAC unit is decomposed into a plurality of fragments stored in respective buffers of the processing circuit, said buffers having the same size for the first operating mode, lower than or equal to 256 bytes, or lower than or equal to 128 bytes.

In specific embodiments, in the cut-through scheme, each data frame is decomposed into a plurality of fragments stored in respective buffers of the processing circuit, and the buffers used for the first operating mode have a smaller size than the buffers used for the second operating mode.

In specific embodiments, the buffers used for the second operating mode have a size higher than or equal to 512 bytes, or higher than or equal to 1024 bytes.

In specific embodiments, data frames received by one of the MAC units are copied in buffers of the processing circuit, from which said data frames are accessed by the host stack and/or by another one of the MAC units.

Hence, copying the data frames from one buffer of the processing circuit to another is not necessary, which enables to reduce the amount of memory required and to avoid the latency introduced by such copies between buffers, at least when the data frame is not to be modified.

In specific embodiments, different buffers store respective fragments of a data frame and, when a target fragment of the data frame is to be modified by removing or inserting data, said target fragment is modified and copied into another buffer while the other fragments are not copied into other buffers.

Hence, if e.g. additional data (e.g. VLAN identifier) is to be inserted in a data frame that is to be forwarded, then only the target fragment of the data frame, i.e. the fragment in which the additional data is to be inserted, is copied from one buffer to another, thereby limiting the latency introduced by such copies between buffers.

In specific embodiments, when TS data frames are generated by the host stack during a second time slice, the single task executed during the first operating mode is configured to forward said TS data frames towards one of the MAC units at the beginning of the next first time slice.

In specific embodiments, the plurality of tasks of the second operating mode comprise a processing task having a higher priority than the task performing the switching functions, said processing task used for generating TS data frames of the host stack, to be transmitted during the next first time slice, and/or for extracting data from TS data frames forwarded towards the host stack during the previous first time slice.

In specific embodiments, the RTOS scheduler is configured to execute said processing task at the beginning of each second time slice during a time interval of predetermined maximum duration.

According to a second aspect, the present disclosure relates to a computer program product comprising instructions which, when executed by a processing circuit, configure said processing circuit to carry out a method according to any one of the embodiments of the present disclosure.

According to a third aspect, the present disclosure relates to a computer-readable storage medium comprising instructions which, when executed by a processing circuit, configure said processing circuit to carry out a method according to any one of the embodiments of the present disclosure.

According to a fourth aspect, the present disclosure relates to a switching device comprising at least two medium access controller, MAC, units, said at least two MAC units being connected to a processing circuit, wherein said processing circuit is configured to carry out a method according to any one of the embodiments of the present disclosure.

In specific embodiments, the switching device can further comprise one or more of the following features, considered either alone or in any technically possible combination.

In specific embodiments, the at least two MAC units are Ethernet MAC units. In some cases, the Ethernet MAC units are compliant with the IEEE802.1Qbv standard.

According to a fifth aspect, the present disclosure relates to a local area network, LAN, comprising a plurality of switching devices according to any one of the embodiments of the present disclosure, wherein at least some of the switching devices are connected together according to a daisy chain topology.

The invention will be better understood upon reading the following description, given as an example that is in no way limiting, and made in reference to the figures.

DESCRIPTION OF EMBODIMENTS

In these figures, references identical from one figure to another designate identical or analogous elements. For reasons of clarity, the elements shown are not to scale, unless explicitly stated otherwise.

Figure 2:
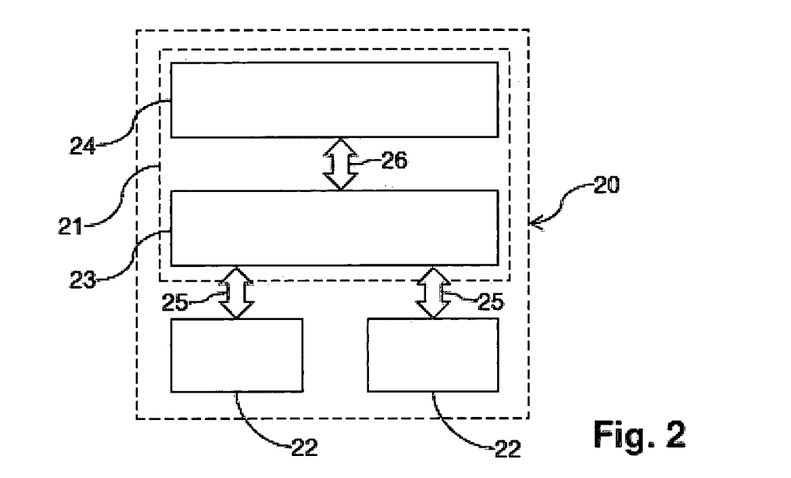
FIG. 2: a schematic representation of a switching device.

FIG. 2 represents schematically an example of switching device 20. As illustrated by FIG. 2, the switching device 20 comprises a processing circuit 21 connected to two MAC units 22.

Each MAC unit 22 is adapted to transmit and receive data frames on a communication channel, according to at least one wired communication protocol. More specifically, the MAC units 22 are connected to respective communication links, e.g. different buses, and these communication links are collectively referred to as communication channel. The MAC units 22 are separate from one another, such that forwarding data frames from one MAC unit 22 towards another MAC unit 22 is necessarily performed via the processing circuit 21.

As discussed above, the MAC units 22 may apply any wired communication protocol. In preferred embodiments, the MAC units 22 are Ethernet MAC units, compliant with IEEE standards such as the 10BASE-T/100BASE-TX IEEE802.3 standards. The Ethernet MAC units 22 may support the IEEE802.1Q standard for VLAN tag detection and/or the IEEE1588-2008 standard for precision networked clock synchronization or gigabit speed. In preferred embodiments, the Ethernet MAC units 22 may support IEEE TSN extensions such as the IEEE802.1Qbv standard.

The processing circuit 21 implements the switching functions, represented in FIG. 2 by a switch 23. The processing circuit 21 comprises one or more processors and storage means (magnetic hard disk, solid-state disk, optical disk, electronic memory, etc.) in which a computer program product (i.e. software) is stored, in the form of a set of program-code instructions to be executed to implement the switch 23. For instance, the processing circuit 21 may be embedded in a micro-processor unit, MPU, or in a micro-controller unit, MCU. In such a case, it should be noted that the MAC units 22 may be separate from the MPU or MCU, but they are preferably embedded in the MPU or MCU in order to reduce the latencies for exchanging data frames between the MAC units and the MPU or MCU.

The switching device 20 comprises also a host stack 24, which corresponds to the high-level software executed by the switching device 20, which may include any protocol layer (e.g. IP, TCP, UDP, etc.), any software related to any application implemented by the switching device 20, etc. It should be noted that the host stack 24 may be implemented by the processing circuit 21 (which therefore implements both the switching functions and the functions performed by the host stack 24) and/or by e.g. an application processor connected to the processing circuit 21, etc.

In the sequel, we assume in a non-limitative manner that the host stack 24 is at least partially implemented by the processing circuit 21, as illustrated by FIG. 2.

In the example illustrated by FIG. 2, the switch 23 comprises three different ports: two physical ports 25, one for each MAC unit 22, and one host port 26 for the host stack 24. The switching functions therefore aim at forwarding a data frame received from any one port among these three ports towards one or more other ports among these three ports. It should be noted that the present disclosure may be applied with any number N≥2 of physical ports and any number M≥1 of host ports, associated to N MAC units 22 and to M host stacks 24.

The processing circuit 21 implements a real-time operating system, RTOS. An RTOS is an operating system intended to serve real-time processing of data as the data is received. Examples of RTOS include FreeRTOS™, RTEMS™, among others. A characteristic of an RTOS is a level of consistency in scheduling and completing a task. As used herein a task may be an operating system operation, which may be invoked by an application executing on the RTOS, or by an Interrupt Service Routine (ISR), or the like.

A soft RTOS is an operating system where not meeting a deadline may have undesirable effects but may be tolerated, for example leading to a performance degradation. In other words, a soft RTOS may meet a deadline in average. The Linux OS Kernel may for example be classified as pertaining to this category because it implements FIFO (first in, first out) or Round Robin process scheduling.

In a firm RTOS, infrequent deadline misses are tolerable as long as they are adequately spaced. A firm RTOS is for example a soft RTOS which was improved to approach a hard RTOS. Most of the time, there is no strict deadline guaranteed by a firm RTOS. Linux kernel with PRE-EMPT_RT patch, or Xenomai are part of this category.

A hard RTOS is an operating system in which not meeting a deadline can have critical effects. RTOSs such as FreeRTOS or RTEMS are part of this category. In some cases, unlike an OS such as Linux, they provide relatively few services, such few services being in some cases related to task/process scheduling and interruption.

In the present disclosure, the RTOS may be a soft RTOS, a firm RTOS or a hard RTOS. However, the RTOS is preferably a hard RTOS, since it provides for reduced latency and jitter.

In a conventional manner, the RTOS comprises a RTOS scheduler for scheduling tasks according to their respective priorities.

The communication over the communication channel is organized according to successive temporal cycles, each temporal cycle comprising at least a first time slice and a second time slice. It should be noted that the temporal cycles may also comprise additional time slices. The first time slices are used for communicating TS data frames while the second time slices are used for communicating NTS data frames. For instance, this is accomplished by using the IEEE802.1Qbv standard. In such a case, the IEEE802.1Qbv standard may be implemented by the MAC units 22 and/or by the processing circuit 21, if e.g. the MAC units 22 do not support the IEEE802.1Qbv standard.

Figure 3:
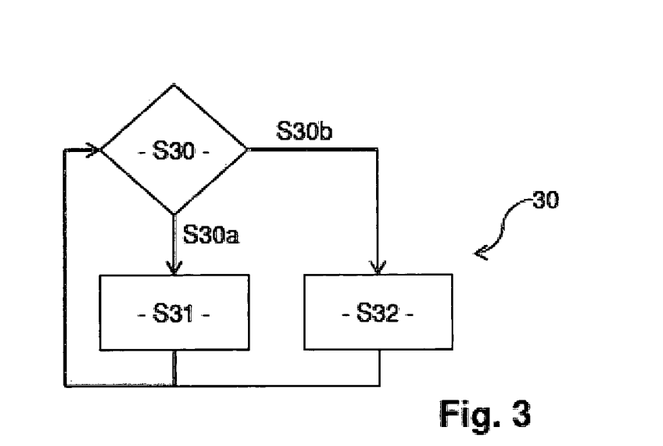
FIG. 3: a diagram representing the main steps of an exemplary embodiment of a switching method.

FIG. 3 represents schematically the main steps of a switching method 30 according to an exemplary embodiment, implemented by the processing circuit 21 of the switching device 20.

As illustrated by FIG. 3, the switching method 30 comprises a step S30 of detecting a time slice. If the time slice detected is a first time slice (reference S30a in FIG. 3), then the switching method 30 comprises a step S31 of applying, by the processing circuit 21, a first operating mode during the duration, known a priori, of the first time slice. In turn, if the time slice detected is a second time slice (reference S30b in FIG. 3), then the switching method 30 comprises a step S32 of applying, by the processing circuit 21, a second operating mode during the duration, known a priori, of the second time slice.

In the sequel, the first operating mode and the first time slices are referred to as respectively TS (time sensitive) operating mode and TS time slices. The second operating mode and the second time slices are referred to as respectively NTS (non-TS) operating mode and NTS time slices. It should be noted that FIG. 3 assumes that there are only two different operating modes (resp. time slices), but the present disclosure may also be applied with more than two different operating modes (resp. time slices).

In the TS operating mode, normal operation of the RTOS is suspended in that the RTOS scheduler is suspended. The processing circuit 21 executes a single task which performs the switching functions, for the whole duration of the TS time slice. Indeed, interrupts may be disabled, such that the single task performing the switching cannot be interrupted or preempted by another task. At the end of the TS time slice, the single task may detect that the NTS time slice is about to start and said single task may trigger the RTOS scheduler.

In the NTS operating mode, normal operation of the RTOS is resumed and the RTOS scheduler schedules the plurality of tasks according to their respective priorities during the whole duration of the NTS time slice. One of the tasks scheduled by the RTOS scheduler performs the switching functions, however this task does not have the highest priority in order to ensure that other tasks may be executed during the NTS time slice. For instance, higher priority tasks implementing critical host stack 24 functions may be prioritized over the task performing the switching functions, which may in turn be prioritized over lower priority tasks implementing non-critical host stack 24 functions. For instance, the plurality of tasks of the NTS operating mode may comprise a processing task having a higher priority than the task performing the switching functions, said processing task being used for generating TS data frames of the host stack 24, to be transmitted during the next TS time slice, and/or for extracting data from TS data frames forwarded towards the host stack 24 during the TS first time slice.

If the interrupts are disabled in the TS operating mode, then the detection of the reception of a TS data frame to be forwarded may be performed, by the processing circuit 21, by recurrently polling status registers associated to buffers used to store TS data frames received from the MAC units 22 or from the host stack 24.

Indeed, the data frames received by a MAC unit 22 may be copied into a buffer, i.e. into a memory space of the processing circuit 21, for instance by a direct memory access, DMA, controller. Once all or part of a received data frame is copied into a buffer, the DMA controller updates a status register to indicate that the corresponding buffer stores data related to a data frame. The status register may correspond to a queue associated to the MAC unit 22, and the queue may be implemented as a ring buffer descriptor containing pointers to buffers storing data related to data frames. Hence, polling the status register corresponds for instance to reading the ring buffer descriptor to detect that data has been copied into a buffer of the processing circuit 21.

Similarly, the data frames generated by the host stack 24 may be copied into a buffer, and the processing circuit 21 may poll the corresponding status registers to detect whether a TS data frame generated by the host stack 24 is to be forwarded towards one of the MAC units 22. It is however emphasized that the generation of the data frames by the host, including the generation of TS data frames, is performed during NTS time slices, such that the TS data frames, generated by the host stack 24 and to be transmitted during a TS time slice, are available at the beginning of said TS time slice. In preferred embodiments, the single task executed during the TS operating mode is then configured to forward said TS data frames towards one of the MAC units 22 at the beginning of the TS time slice. For instance, this may be done by polling at the beginning of the TS time slice the status registers of the ring buffers in which such TS data frames generated by the host stack 24 are to be copied. As described previously, these status registers correspond for instance to ring buffer descriptors which are read by the processing circuit 21.

Generally speaking, in order to detect quickly the reception of data frames to be forwarded, the status registers may be polled frequently. If the polling is performed periodically, the lower the polling period, the quicker the detection of the reception of a data frame to be forwarded.

In order to further reduce the latency for the TS data frames, in the TS operating mode, the processing circuit 21 may apply a cut-through scheme in some embodiments. In such a cut-through scheme, the processing of a data frame by the switching functions starts before the whole data frame is received. Typically, in the cut-through scheme, small buffers are used, and a data frame received by a MAC unit 22 will be decomposed into a plurality of fragments stored in respective buffers of the processing circuit 21. Hence, as soon a fragment of the data frame is received, it is copied into a buffer and processed by the processing circuit 21 before the other fragments are received and copied into buffers. The forwarding may then start as soon as the fragment containing the address of the recipient of the data frame is processed. Hence, the cut-though scheme enables to reduce latency, at the expense of not being able to check the integrity of a received data frame since the frame check sequence (FCS) generally appears at the end of the data frame.

Such a cut-through scheme may require using small buffers to store data frame fragments. In a conventional system, using small buffers would increase the number of interrupts generated for receiving a data frame. However, in the TS operating mode, the interrupts are disabled such that small buffers can be used without impacting the operation of the RTOS.

Preferably, in the TS operating mode, the buffers used are small. For instance, said buffers have the same size for the TS operating mode, lower than or equal to 256 bytes, or lower than or equal to 128 bytes.

In the NTS operating mode, the timing constraints are lower than in the TS operating mode, such that it possible to use either a cut-through scheme or a store and forward scheme. In a store and forward scheme, a data frame is processed and forwarded only after it has been entirely copied into one or more buffers, thereby increasing the latency with respect to the cut-through scheme. However, with a store and forward scheme, the integrity of the data frame may be checked before forwarding the data frame, such that it is possible to avoid forwarding corrupted data frames.

Preferably, the NTS operating mode uses a store and forward scheme. Regardless the scheme used (cut-through or store and forward), the NTS operating mode preferably uses buffers having a higher size than the buffers used in the TS operating mode. For instance, the buffers used for the NTS operating mode have a size higher than or equal to 512 bytes, or higher than or equal to 1024 bytes.

Table 1 provides an example of tasks and their associated priorities, executed during TS and NTS times slices.

TABLE 1

Example of tasks and associated priorities

| Priority | TS time slice | NTS time slice |
|---|---|---|
| 1 | Task #0 (DMA management + switching functions) | Task #1 (DMA management) |
| 2 | Ø | Task #2 (critical host stack functions, e.g. generating TS data frames of the host stack, extracting data from TS data frames for the host stack) |
| 3 | Ø | Task #3 (switching functions) |
| 4 | Ø | Task #4 (non-critical host stack functions, e.g. generating NTS data frames of the host stack, extracting data from NTS data frames for the host stack) |

In the example given by table 1, the single task #0 executed during TS time slices performs also the DMA management, while DMA management is performed during a separate task, having the highest priority, during NTS time slices. DMA management includes instructing the DMA controller to copy data from buffers of the processing circuit 21 into internal memories of the MAC units 22, and vice versa. This example also shows that the tasks performing the switching functions are typically different during TS time slices (single task #0) and NTS time slices (task #2).

Figure 4:
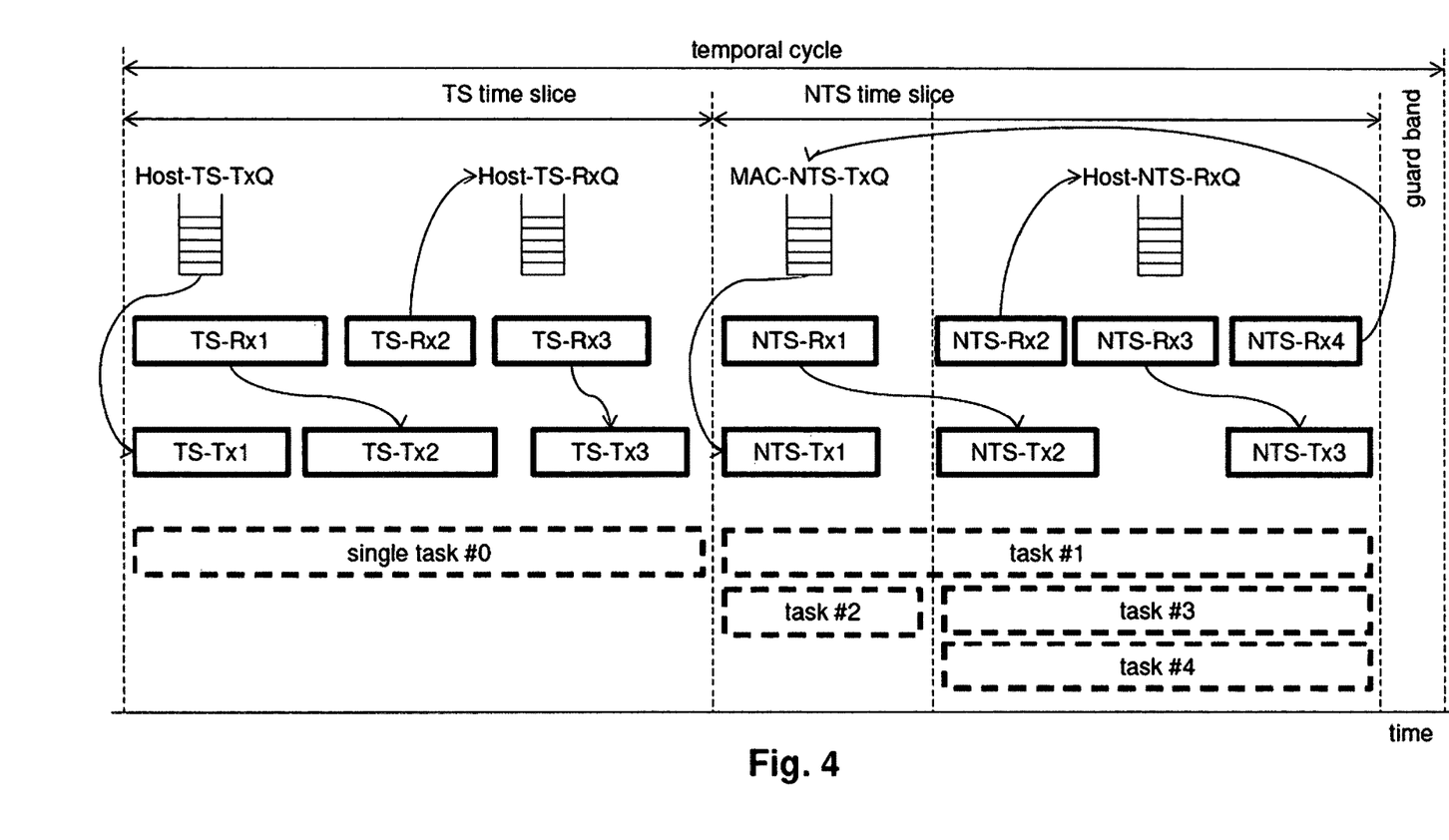
FIG. 4: a temporal diagram illustrating an example of switching of data frames when using the switching method.

FIG. 4 represents a temporal diagram illustrating an example of switching of data frames when using the tasks and priorities given by table 1. In this example, several queues are represented schematically:

Host-TS-TxQ corresponds to the queue of the host port 26 for TS data frames generated and transmitted by the host stack 24;

Host-TS-RxQ corresponds to the queue of the host port 26 for TS data frames received for the host stack 24;

MAC-NTS-TxQ corresponds to the queue of a physical port 25 for NTS data frames to be transmitted by a MAC unit 22;

Host-NTS-RxQ corresponds to the queue of the host port 26 for NTS data frames received for the host stack 24.

As discussed previously, these queues are preferably implemented as ring buffer descriptors containing pointers to buffers storing data related to TS/NTS data frames.

As illustrated by FIG. 4, the single task #0 is the only task running during the TS time slice, and the switching device 20 receives successively, during said TS time slice, three different TS data frames designated by TS-Rx1, TS-Rx2 and TS-Rx3. In this example, the single task #0 begins by forwarding the TS data frames in the Host-TS-TxQ queue towards one of the MAC units 22. In this example, there is only one TS data frame in the Host-TS-TxQ queue, designated by TS-Tx1. Then the single task #0 forwards the TS data frames received from MAC units 22 towards the MAC units 22 and/or towards the host stack 24. In this example, the TS data frames TS-Rx1 and TS-Rx3 are retransmitted on the communication channel by the MAC units 22, as TS data frames respectively TS-Tx2 and TS-Tx3. As illustrated by FIG. 4, both TS data frames TS-Rx1 and TS-Rx3 are retransmitted before they are fully received, due to the cut-through scheme used in the TS operating mode. The TS data frame TS-Rx2 is for the host stack 24 and is forwarded to the Host-TS-RxQ queue. It should be noted that the duration of the TS time slice may be configured by design to ensure that all TS data frames (i.e. those in the Host-TS-TxQ and those received by a MAC unit 22 and forwarded towards another MAC unit 22) can be transmitted during the TS time slice.

During the NTS time slice, the tasks #1 to #4 are then executed according to their respective priorities. The NTS time slice begins with task #1 forwarding the NTS data frames in the MAC-NTS-TxQ queue towards one of the MAC units 22. In this example, there is only one NTS data frame in the MAC-NTS-TxQ queue, designated by NTS-Tx1.

As illustrated by FIG. 4, the task #2 is executed at the beginning of the NTS time slice. The task #2 corresponds to the processing task discussed above in charge of generating TS data frames of the host stack 24 and extracting data from TS data frames received for the host stack 24. Basically, generating a TS data frame corresponds to constructing the TS data frame and posting it into the Host-TS-TxQ queue. Extracting data from a TS data frame received for the host stack 24 corresponds to extracting data from the data frames in the Host-TS-RxQ queue. Preferably, the task #2 is executed at the beginning of the NTS time slice during a time interval of predetermined maximum duration (lower than the duration of the NTS time slice) to ensure that there remains time for executing the other tasks having lower priorities, including the task #3 performing the switching functions. As illustrated by FIG. 4, the switching device 20 receives successively, during said NTS time slice, four different NTS data frames designated by NTS-Rx1, NTS-Rx2, NTS-Rx3 and NTS-Rx4, which are copied into buffers of the processing circuit 21 by the task #1. In this example, the NTS data frame NTS-Rx1 is retransmitted by the task #3 (and the task #1), as NTS-Tx2. The task #3 detects that the NTS data frame NTS-Rx2 is for the host stack 24 and posts it into the Host-NTS-RxQ queue for further processing by task #4. The NTS data frame NTS-Rx3 is retransmitted by the task #3 (and the task #1), as NTS-Tx3. The NTS data frame NTS-Rx4 is also to be retransmitted by the task #3, but there is not enough time left in the NTS time slice. The NTS data frame NTS-Rx4 is, in this example, posted into the MAC-NTS-TxQ queue for transmission during the next NTS time slice.

Also, the task #4 may be executed in order to perform non-critical host stack functions, which may include e.g. the generation of NTS data frames by the host stack 24, the extraction of data from NTS data frames received for the host stack 24 such as frame NTS-Rx2 and higher-level functions accomplished by the host stack 24.

Figure 5:
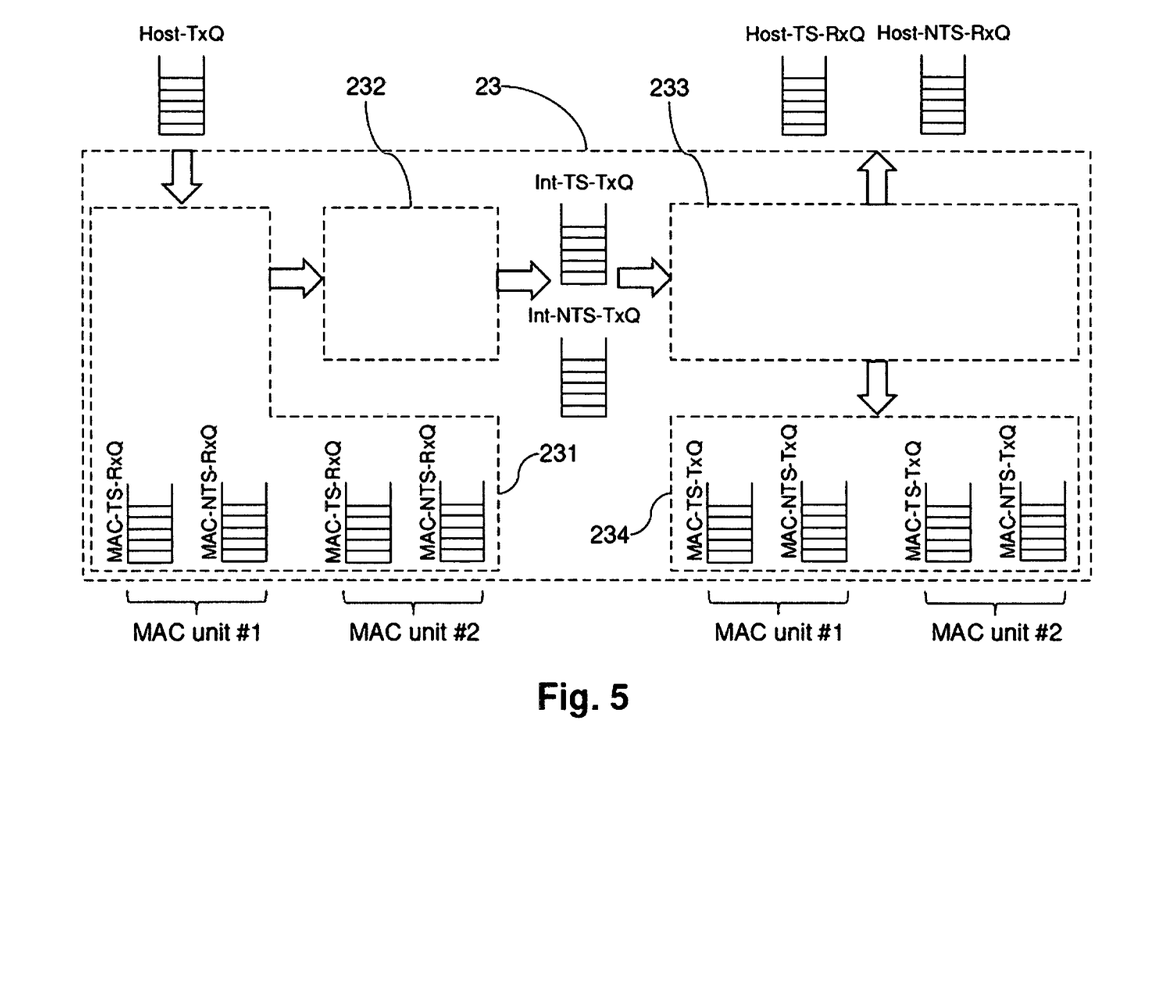
FIG. 5: a schematic representation of a software architecture for performing switching functions according to a first example.

FIG. 5 represents schematically an example of possible software architecture for the switch 23 performing the switching functions, implemented by the processing circuit 21. As illustrated by FIG. 5, the software architecture comprises in this example:
  a data frame receiver 231;
  a data frame classifier 232;
  a data frame forwarder 233;
  a data frame transmitter 234.

The data frame receiver 231 handles the queues for the data frames received by the MAC units 22 (mostly DMA control). Hence, the data frame receiver 231 instructs the DMA controller to copy data from internal memories of the MAC units 22 into queues of the processing circuit 21. These queues may be implemented as ring buffer descriptors containing pointers to buffers storing data related to data frames received by the MAC units 22. These buffers may be allocated by the data frame receiver 231.

In the example illustrated by FIG. 5, the MAC units 22 are assumed to support the IEEE802.1Qbv standard, and the TS data frames and the NTS data frames can be sent to different queues, denoted respectively by MAC-TS-RxQ and MAC-NTS-RxQ for each MAC unit 22.

As discussed above, depending on whether the TS operating mode or the NTS operating mode is used, the data frame receiver 231 may detect that a data frame has been received by one of the MAC units 22 by polling the queues (to reduce latency) or into the ISR. The data frame receiver 231 dispatches the received data frames to the data frame classifier 232. Depending on whether a cut-through scheme is used or not, data frame dispatching may be started upon reception of the first or last fragment of the data frame.

The data frame receiver 231 handles also the queues of the host port 26 with the host stack 24 which contain data frames generated by the host stack 24, to be transmitted by one or more MAC units 22. In this example, there is only one queue, designated Host-TxQ. Of course, it is also possible to have more than one queue, for instance one queue for TS data frames and one queue for NTS data frames, or different queues for different quality of services (QoS), or more generally different queues for different Traffic Classes (TC), etc.

The data frame classifier 232 inspects the data frames in order to determine the TC of each received data and posts them in different internal queues associated respectively to the different TCs considered. In the example illustrated by FIG. 5, the TCs considered are respectively TS data frames and NTS data frames, and the queues are designated by respectively Int-TS-TxQ and Int-NTS-TxQ. Since the MAC units 22 already classify the received data frames into TS and NTS data frames, they are dispatched directly to their corresponding queue among the Int-TS-TxQ and Int-NTS-TxQ queues. In this example, the data frame classifier 232 classifies mainly the data frames received in the Host-TxQ queue and forwards the data frames classified as TS and NTS towards the Int-TS-TxQ and Int-NTS-TxQ queues, respectively.

The data frame forwarder 233 applies forwarding rules based e.g. on predetermined tables. Basically, the data frame forwarder 233 determines whether a received data frame is to be forwarded towards one or more MAC units 22 or towards a host port 26, i.e. towards the host stack 24. Data frames for the host stack 24 are, in this example, posted into two different queues designated respectively by Host-TS-RxQ and Host-NTS-RxQ. The data frames to be retransmitted by MAC units 22 are dispatched to the data frame transmitter 234.

It should be noted that the data frame forwarder 233 may also, in some cases, modify the data frames in the Int-TS-TxQ and Int-NTS-TxQ queues. For instance, the data frame forwarder 233 may insert additional data in frame headers, e.g. a VLAN identifier, into a data frame to be transmitted by a MAC unit 22, or replace a VLAN identifier by another one, etc.

The data frame transmitter 234 handles the queues for the data frames to be transmitted by the MAC units 22 (mostly DMA control). Hence, the data frame transmitter 234 instructs the DMA controller to copy data in queues of the processing circuit 21 into internal memories of the MAC units 22. These queues may be implemented as ring buffer descriptors containing pointers to buffers storing data related to data frames to be transmitted by the MAC units 22. The data frame transmitter 234 may inspect the queues to check correct transmission of the data frames by the MAC units 22, in order to e.g. release the buffers allocated by the data frame receiver 231.

In the example illustrated by FIG. 5, the MAC units 22 are assumed to support the IEEE802.1Qbv standard, and the TS data frames and the NTS data frames are posted into different queues, denoted respectively by MAC-TS-TxQ and MAC-NTS-TxQ for each MAC unit 22, from which they are transferred to the MAC units 22 by the DMA controller.

Figure 6:
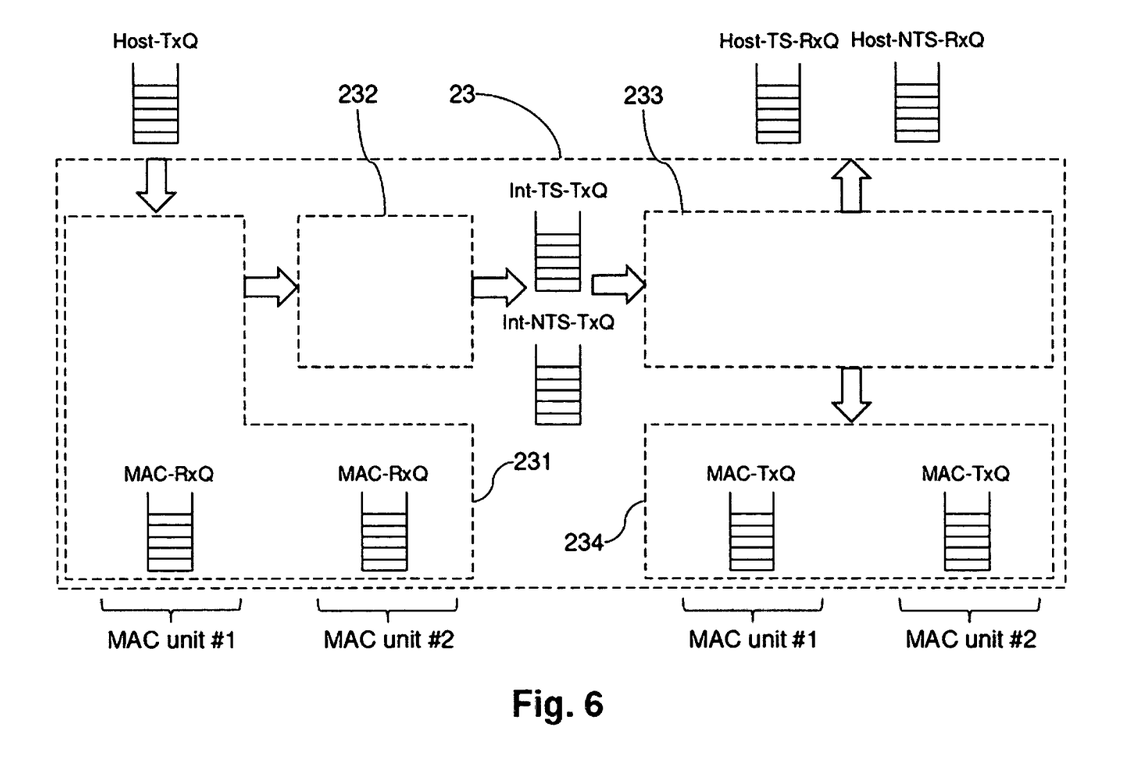
FIG. 6: a schematic representation of a software architecture for performing switching functions according to a second example.

FIG. 6 represents schematically another non-limitative example of a possible software architecture for the switch 23 performing the switching functions, implemented by the processing circuit 21.

As illustrated by FIG. 6, the software architecture comprises also a data frame receiver 231, a data frame classifier 232, a data frame forwarder 233 and a data frame transmitter 234. Compared with the example in FIG. 5, the main difference is that the MAC units 22 do not support the IEEE802.1Qbv standard, which is therefore implemented by the processing circuit 21. The MAC units 22 comprise each one queue MAC-RxQ for the received data frames (which comprises both TS and NTS data frames) and one queue MAC-TxQ for the data frames to be transmitted.

In the example illustrated by FIG. 6, the data frame classifier 232 therefore classifies the data frames received from the host stack 24 and the data frames received from the MAC units 22. For instance, if the received data frames comprise a VLAN priority, then it is possible to post the data frames having the VLAN priority 7 into the Int-TS-TxQ queue, and the data frames having the VLAN priorities 0-6 into the Int-NTS-TxQ queue.

The data frame transmitter 234 then preferably comprises a frame scheduler which implements the IEEE802.1Qbv standard. Hence, the frame scheduler posts the TS data frames and the NTS data frames into the MAC-TxQ queues of the MAC units 22 according to the TS time slices and the NTS time slices of each temporal cycle. In this case, the MAC units 22 support time-based scheduling, i.e. the MAC units 22 are capable of transmitting a data frame at a given time based on e.g. a network clock (e.g. IEEE1588-2008).

Of course, the examples illustrated by FIGS. 5 and 6 are non-limitative and other examples are possible. For instance, the data frame classifier 232 may classify the data frames into TCs which do not correspond directly to the TS and NTS traffic classes. For instance, it may classify the received data frames according to their respective QoS (in which case they are dispatched to different queues associated to different QoS), according to their respective VLAN priorities (in which case they are dispatched to different queues associated to different VLAN priorities), etc. In that case, the data frame transmitter 234 and/or the data frame forwarder 233 may perform a mapping between the different TCs considered and the TS and NTS traffic classes before transmission by the MAC units 22 (for instance data frames with a VLAN priority 7 are transmitted as TS data frames while data frames with a VLAN priorities 0-6 are transmitted as NTS data frames, etc.).

In preferred embodiments, the data frames received by the MAC units 22 are copied in buffers of the processing circuit 21, from which said data frames can be accessed by the host stack 24 and/or by another one of the MAC units 22 (via the DMA controller). Hence, in such embodiments, copying a data frame from one buffer of the processing circuit 21 to another one is prevented as far as possible.

If we consider the example provided by FIG. 5, then this implies that, if a data frame received by a MAC unit 22 is to be forwarded towards another MAC unit 22 without modification, then the corresponding queues comprise pointers to the buffer containing this data frame (or to the plurality of buffers containing this data frame if it has been fragmented). For instance, if the data frame is a TS data frame, this implies that the pointers of the MAC-TS-RxQ, Int-TS-TxQ and MAC-TS-TxQ queues point towards the same one or more buffers. This enables to reduce the required amount of memory and processing CPU power, thereby avoiding the latency introduced by such copies between buffers, at least when the data frame needs not to be modified. Similarly, for a TS data frame received by a MAC unit 22 for the host stack 24, the pointers of the MAC-TS-RxQ, Int-TS-TxQ and Host-TS-RxQ queues point towards the same one or more buffers.

Hence, a same buffer may be used by different processes, and a given buffer can be released only when the last process that uses it is terminated. For instance, if a data frame is forwarded to a plurality of MAC units 22, the corresponding buffer(s) can be released only when all the MAC units 22 have completed the transmission of the data frame. A possible implementation of such a feature is to associate a reference counter to each buffer. This counter must be incremented each time a process gets a reference on it (i.e. uses the buffer). The counter is decremented each time a process loses any reference on it (i.e. no longer needs to use the buffer). When the reference counter reaches 0, the associated buffer can be released effectively.

If the size of a data frame needs to be modified, e.g. by inserting data in or by removing data from said data frame, then said data frame is preferably fragmented into a plurality of fragments which are stored in respective buffers. The one or more fragments that need to be modified by adding or removing data, referred to as target fragments, are therefore the only fragments that are copied into other buffers of the processing circuit 21. Hence the data frame is not entirely copied from one buffer to another, but only its target fragments. The pointers to the buffers containing unmodified fragments are therefore not modified, while the pointers to the buffers containing the target fragments are modified to point to the buffers in which the modified target fragments have been copied. Hence, copies between buffers, when required, are limited to those buffers containing target fragments of the data frames, thereby reducing the latency introduced by such copies between buffers.

The switching device 20 may be used e.g. in a local area network, LAN, such as an industrial LAN. Such a LAN may comprise a plurality of such switching devices 20, with at least some of switching devices 20 being connected together according to a daisy chain topology. However, it is emphasized that the switching devices 20 may also be connected together according to other network topologies.

The invention claimed is:

1. A method for performing software switching functions by a processing circuit of a switching device, said switching device further comprising a host stack and at least two medium access controller, MAC, units for communicating data frames on a communication channel, said host stack including application software executed by the switching device, said at least two MAC units being connected to the processing circuit, said method comprising:
    applying, by the processing circuit, a first operating mode during a first time slice of a temporal cycle, wherein in the first operating mode the processing circuit executes a single task which performs at least one first software switching function among the software switching functions, the software switching functions comprising forwarding data frames received by one of the MAC units towards another one of the MAC units and/or towards the host stack, and/or forwarding data frames received from the host stack towards one of the MAC units, the communication over the communication channel being organized according to successive temporal cycles including the temporal cycle, the temporal cycle comprising at least the first time slice and a second time slice, wherein the processing circuit implements a real-time operating system (RTOS), normal operation of the RTOS includes operating a RTOS scheduler to schedule a plurality of tasks based on a priority of each task among the plurality of tasks, the tasks each having one of a plurality of priorities, a highest priority among the plurality of priorities being time sensitive, wherein in the first operating mode the normal operation of the RTOS is suspended in that the RTOS scheduler is suspended; and
    applying, by the processing circuit, a second operating mode in the second time slice, wherein in the second operating mode the normal operation of the RTOS is resumed and at least one second software switching function among the software switching functions is performed by a first task among the plurality of tasks which has a first priority which is not the highest priority.

2. The method according to claim 1, wherein the processing circuit is configured to detect the reception of a data frame to be forwarded by recurrently polling status registers associated to buffers used to store data frames received from MAC units or from the host stack.

3. The method according to claim 1, wherein:
in the first operating mode, the processing circuit applies a cut-through scheme in which forwarding of a data frame starts before the whole data frame is received;
in the second operating mode, the processing circuit applies the cut-through scheme or a store and forward scheme in which forwarding of a data frame starts only after the whole data frame is received.

4. The method according to claim 3, wherein, in the cut-through scheme, each data frame received by a MAC unit is decomposed into a plurality of fragments stored in respective buffers of the processing circuit, said buffers having the same size for the first operating mode, lower than or equal to 256 bytes, or lower than or equal to 128 bytes.

5. The method according to claim 4, wherein the buffers used for the second operating mode have a size higher than or equal to 512 bytes, or higher than or equal to 1024 bytes.

6. The method according to claim 1, wherein data frames received by one of the MAC units are copied in buffers of the processing circuit, from which said data frames are accessed by the host stack and/or by another one of the MAC units.

7. The method according to claim 6, wherein different buffers store respective fragments of the received data frames and, when a target fragment of a data frame among the received data frames is to be modified by removing or inserting data, said target fragment is modified and copied into another buffer while the other fragments of the data frame among the received data frames are not copied into other buffers.

8. The method according to claim 1, wherein, when time sensitive data frames are generated by the host stack during a second time slice, the single task executed during the first operating mode is configured to forward said time sensitive data frames towards one of the MAC units at the beginning of the next first time slice.

9. The method according to claim 1, wherein during the second operating mode a second task is scheduled, the second task comprises a processing task having a higher priority than the first task, said second task being used for generating time sensitive data frames of the host stack, to be transmitted during the next first time slice, and/or for extracting data from time sensitive data frames forwarded towards the host stack during a previous first time slice.

10. The method according to claim 9, wherein the RTOS scheduler is configured to execute the second task at the beginning of a plurality of second time slices including the second time slice during a time interval of predetermined maximum duration.

11. A non-transitory computer-readable storage medium comprising instructions which, when executed by a processing circuit, configure said processing circuit to carry out the method according to claim 1.

12. A switching device comprising at least two medium access controller, MAC, units, said at least two MAC units being connected to a processing circuit, wherein said processing circuit is configured to:
apply a first operating mode during a first time slice of a temporal cycle, wherein in the first operating mode the processing circuit executes a single task which performs at least one first software switching function among software switching functions, the software switching functions comprising forwarding data frames received by one of the MAC units towards another one of the MAC units and/or towards the host stack, and/or forwarding data frames received from the host stack towards one of the MAC units, the communication over the communication channel being organized according to successive temporal cycles including the temporal cycle, the temporal cycle comprising at least the first time slice and a second time slice, wherein the processing circuit implements a real-time operating system (RTOS), normal operation of the RTOS includes operating a RTOS scheduler to schedule a plurality of tasks based on a priority of each task among the plurality of tasks, the tasks each having one of a plurality of priorities, a highest priority among the plurality of priorities being time sensitive, wherein in the first operating mode the normal operation of the RTOS is suspended in that the RTOS scheduler is suspended; and
apply a second operating mode in the second time slice, wherein in the second operating mode the normal operation of the RTOS is resumed and at least one second software switching function among the software switching functions is performed by a first task among the plurality of tasks which has a first priority which is not the highest priority.

13. The switching device according to claim 12, wherein the at least two MAC units are Ethernet MAC units.

14. The switching device according to claim 12, wherein the switching device is included in a Local Area Network, LAN, the local area network including a plurality of switching devices including the switching device,
the switching device is connected with at least one other of the plurality of switching devices according to a daisy chain topology.

* * * * *